(12) United States Patent
Chen et al.

(10) Patent No.: US 11,774,638 B2
(45) Date of Patent: Oct. 3, 2023

(54) LENS PROTECTION STRUCTURE AND ELECTRONIC DEVICE HAVING LENS PROTECTION STRUCTURE

(71) Applicant: TRIPLE WIN TECHNOLOGY(SHENZHEN) CO.LTD., Shenzhen (CN)

(72) Inventors: Shin-Wen Chen, New Taipei (TW); Long-Fei Zhang, Guangdong (CN); Kun Li, Guangdong (CN); Hao-Zhong Liu, Guangdong (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 289 days.

(21) Appl. No.: 17/195,898

(22) Filed: Mar. 9, 2021

(65) Prior Publication Data
US 2022/0221618 A1    Jul. 14, 2022

(30) Foreign Application Priority Data
Jan. 14, 2021  (CN) .......................... 202110050011.0

(51) Int. Cl.
*G02B 1/14*    (2015.01)
*G02B 7/02*    (2021.01)

(52) U.S. Cl.
CPC ............... *G02B 1/14* (2015.01); *G02B 7/021* (2013.01)

(58) Field of Classification Search
None
See application file for complete search history.

(56) References Cited

U.S. PATENT DOCUMENTS

| 2014/0184902 A1* | 7/2014 | Chen | H04N 23/54 |
| | | | 348/374 |
| 2020/0192064 A1* | 6/2020 | Li | G02B 6/4427 |

FOREIGN PATENT DOCUMENTS

| CN | 209568055 U | * | 11/2019 |
| CN | 110620858 A |   | 12/2019 |
| CN | 210491003 U | * | 5/2020 |
| CN | 111347749 A | * | 6/2020 |
| CN | 211557342 U | * | 9/2020 |
| CN | 211557342 U |   | 9/2020 |
| CN | 211981975 U |   | 11/2020 |
| TW | 202013048 A |   | 4/2020 |

* cited by examiner

*Primary Examiner* — Shan Liu
(74) *Attorney, Agent, or Firm* — ScienBiziP, P.C.

(57) ABSTRACT

A lens protection structure includes a base, a polyester film, a first silica gel, a second silica gel, and a protective cover. Each of the base, the polyester film, the first silica gel, and the second silica gel defines a through hole for cooperatively receiving a lens. The polyester film is coupled to a surface of the base, and the first silica gel is coupled to a surface of the base opposite the polyester film. The second silica gel is coupled to the polyester film. The protective cover is coupled to the second silica gel and seals a receiving cavity within the base. At least one air escape channel is defined in the base. The at least one air escape channel communicates the receiving cavity of the base to an exterior of the lens protection structure.

10 Claims, 5 Drawing Sheets

LENS PROTECTION STRUCTURE AND ELECTRONIC DEVICE HAVING LENS PROTECTION STRUCTURE

FIELD

The subject matter herein generally relates to lens modules, and more particularly to a lens protection structure and an electronic device having the lens protection structure.

BACKGROUND

Generally, a lens is installed on a lens holder after the lens holder and a circuit board are assembled. Because a surface of the lens is fragile and dust and impurities will contaminate the lens, a protection structure is attached to the lens to protect the lens.

At present, most protection structures are generally foam protection structures or injection-molded structures. However, the foam protection structure is relatively soft and easy to break, thereby producing debris, which will contaminate the lens.

After the foam protection structure or the injection-molded structure is attached to the lens, a closed space is formed between the lens and the protection structure. When heated, internal air expands, which may cause the protection structure to separate from the lens. During an attachment process, the internal air is compressed, which may make the attachment unstable. Furthermore, due to a difference in air pressure between the inside and outside environments of the protection structure, it may be difficult to remove the protection structure.

BRIEF DESCRIPTION OF THE DRAWINGS

Implementations of the present disclosure will now be described, by way of embodiments, with reference to the attached figures.

DETAILED DESCRIPTION

Figure 1:
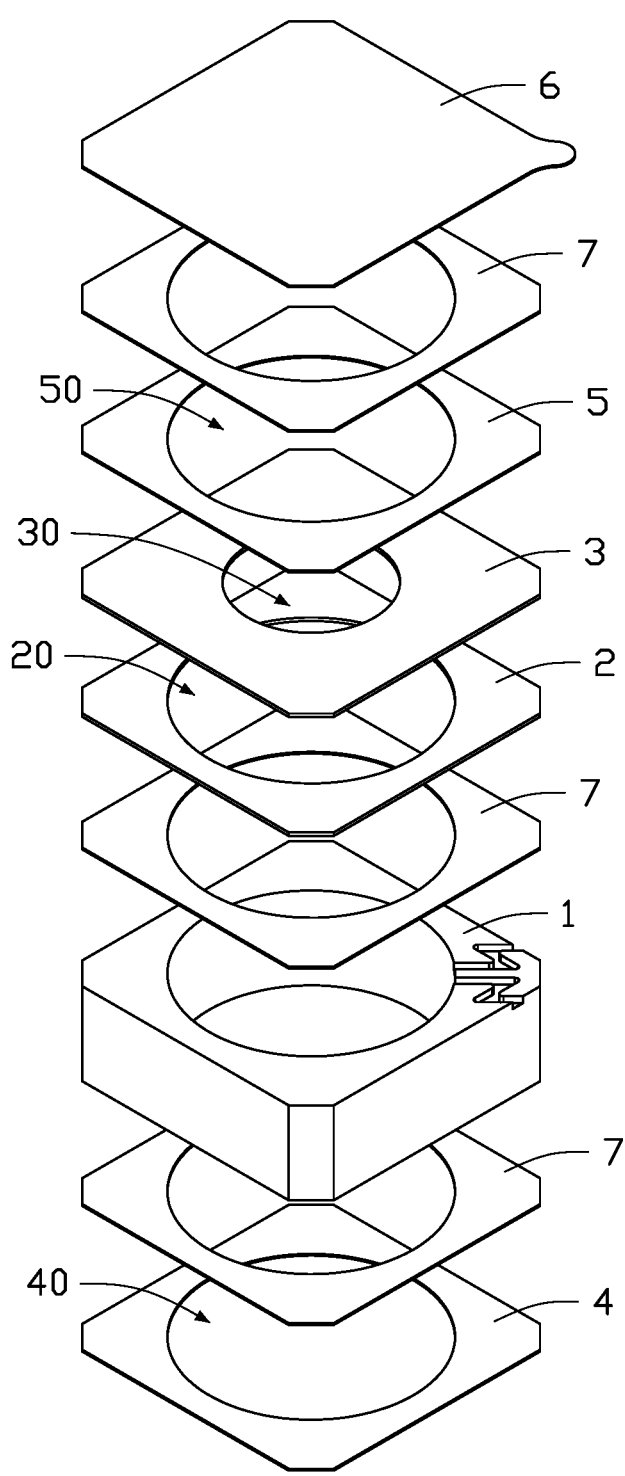
FIG. 1 is an exploded, perspective diagram of a lens protection structure according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIGS. 1-4 show an embodiment of a lens protection structure 100, which includes a base 1, a polyester film 2, an optical film 3, a first silica gel 4, a second silica gel 5, and a protective cover 6. Each of the polyester film 2 and the first silica gel 4 are coupled to a surface of the base 1 by a corresponding double-sided tape 7. The optical film 3 is coupled to the polyester film 2. The second silica gel 5 is coupled to the optical film 3. The protective cover 6 is coupled to the second silica gel 5 through another double-sided tape 7.

After the base 1, the polyester film 2, the optical film 3, the first silica gel 4, the second silica gel 5, and the protective cover 6 are coupled and fixed by the double-sided tapes 7, the lens protective structure 100 is formed by die cutting.

Each of the base 1, the polyester film 2, the optical film 3, the first silica gel 4, and the second silica gel 5 is a substantially hollow structure defining a through hole for receiving a lens. The protective cover 6 is covered on the second silica gel 5 so that the lens is enclosed in the lens protection structure 100.

The base 1 may be made of foam or injection molding materials. The foam may be a silicon-based foam substrate. The base 1 is a substantially cuboid frame and includes a first surface 10 and a second surface (not shown) opposite the first surface 10. The polyester film 2 is attached to the first surface 10 by the corresponding double-sided tape 7. The first silica gel 4 is attached to the second surface through the corresponding double-sided adhesive 7.

Figure 2:
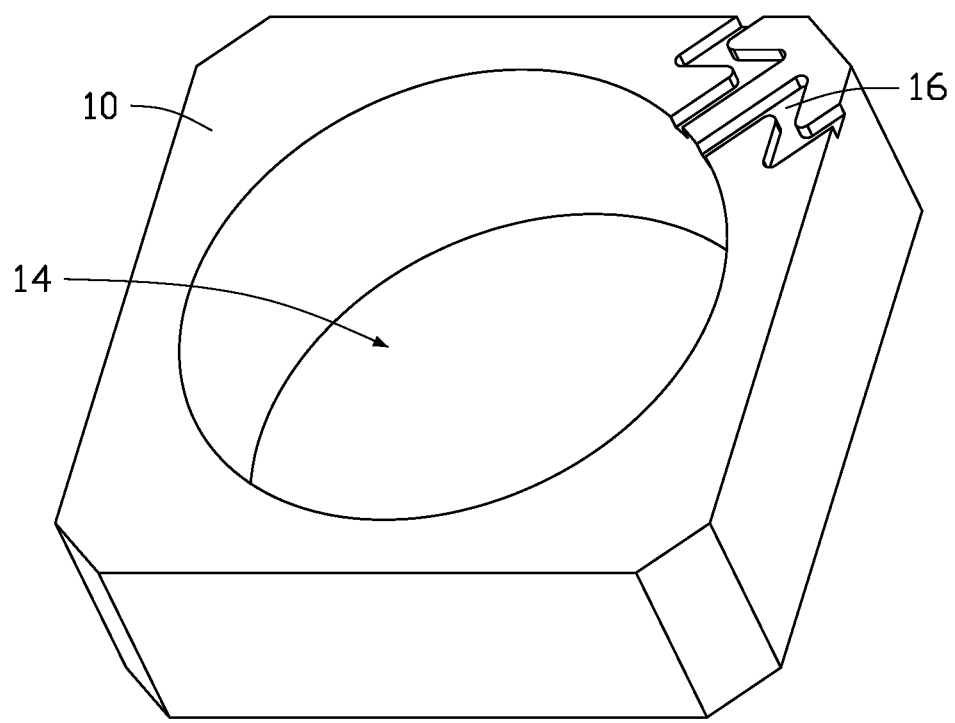
FIG. 2 is a perspective view of a base shown in FIG. 1.
Figure 3:
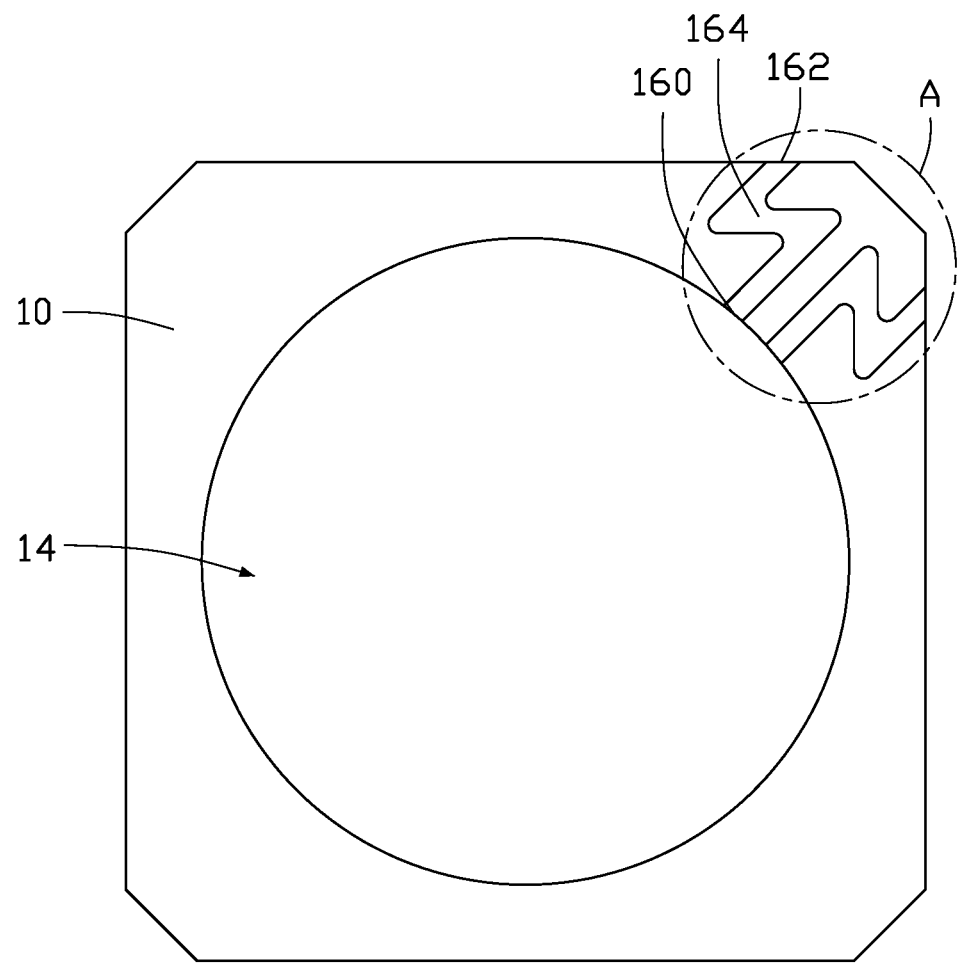
FIG. 3 is a top view of the base shown in FIG. 2.
Figure 4:
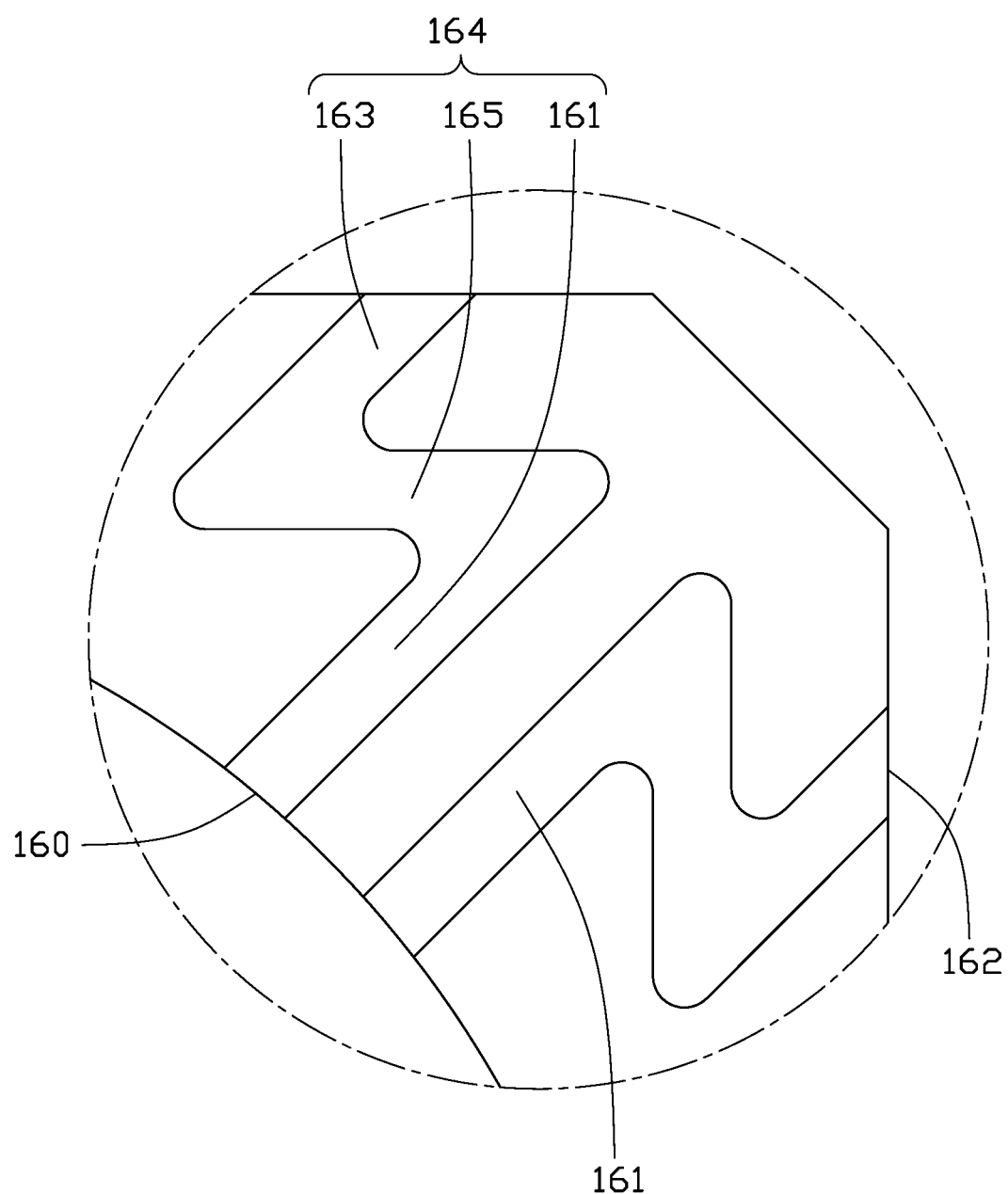
FIG. 4 is an enlarged view of a circled portion A in FIG. 3.

Referring to FIGS. 2-4, the base 1 is provided with a through hole 14 penetrating the first surface 10 and the second surface. The through hole 14 is used for receiving the lens. When the lens is received in the through hole 14, a receiving cavity (not shown) is formed between an inner side wall of the base 1 and the lens. When the protective cover 6 is covered on the second silica gel 5, the receiving cavity is isolated from the outside.

The base 1 is also provided with at least one air escape channel 16. The air escape channel 16 communicates with the outside and the receiving cavity. One end of the air escape channel 16 is in communication with the receiving cavity, and another end of the air escape channel 16 is in communication with the outside. The air escape channel 16 in communication with the inside and outside of the lens protection structure 100 can reduce an air pressure difference between the inside and the outside of the lens protection structure 100 caused during a manufacturing process and in the environment. The air escape channel 16 further has a ventilation function, thereby improving a stability of adhesion of the lens protection structure 100 to the lens and facilitating removal of the lens protection structure 100. In addition, the air escape channel 16 can absorb dust and impurities in the air entering the air escape channel 16, thereby reducing contamination of the lens.

In one embodiment, there are two air escape channels 16 defined in the first surface 10 of the base 1. Each of the air escape channels 16 is substantially a Z-shaped groove recessed in the first surface 10. Each of the air escape channels 16 includes a first end 160, a second end 162, and a channel portion 164. The first end 160 and the second end 162 are respectively opposite ends of the channel portion 164. The first end 160 communicates with the through hole 14 inside the base 1, and the second end 162 communicates with the outside.

The channel portion 164 includes a first channel portion 161, a second channel portion 163, and a third channel portion 165. The third channel portion 165 is coupled between the first channel portion 161 and the second channel portion 163. In one embodiment, an acute angle is formed between the third channel portion 165 and the first channel portion 161 and between the third channel portion 165 and the second channel portion 163. Thus, dust and other impurities in the air are more easily trapped inside the air escape channel 16 and prevented from contaminating the lens. In one embodiment, the angle between the third channel portion 165 and the first channel portion 161 and between the third channel portion 165 and the second channel portion 163 is less than or equal to 45°.

In one embodiment, the first channel portion 161 and the second channel portion 163 are substantially parallel to each other and coupled to each other through the third channel portion 165. The first end 160 is located at an end of the first channel portion 161, and the second end 162 is located at an end of the second channel portion 163.

The two air escape channels 16 are spaced from each other, and the first channel portions 161 of the two air escape channels 16 are adjacent and substantially parallel to each other.

Air in the receiving space between the base 1 and the lens can flow out of the air escape channels 16. The angled design of the air escape channels 16 increases a total length of the air escape channel 16, so that dust and impurities in the air are collected in the air escape channel 16 to reduce the risk of dust and impurities from entering the receiving space and contaminating the lens.

The air escape channel 16 may be a pipe structure or a channel structure provided in the base 1. The air escape channel 16 may be a single pipe structure or a combined pipe structure. In one embodiment, the air escape channel 16 is a single pipe structure.

In other embodiments, the air escape channel 16 may be a linear structure or a curved structure.

In one embodiment, the polyester film 2 is a polymer plastic film colored with additive particles of a certain color, such as a red. The polyester film 2 has a high light transmittance and is substantially square. The polyester film 2 is attached to the first surface 10 of the base 1 through the corresponding double-sided tape 7. The polyester film 2 is provided with a substantially circular through hole 20, and the through hole 20 corresponds in position to the through hole 14 of the base 1.

In one embodiment, the optical film 3 is a transparent polyester film and attached to the polyester film 2. The optical film 3 is provided with a substantially circular through hole 30. The through hole 30 corresponds in position to the through hole 20 of the polyester film 2 and the through hole 14 of the base for receiving the lens.

The first silica gel 4 is attached to the second surface of the base 1 by the corresponding double-sided tape 7. The first silica gel 4 is provided with a substantially circular through hole 40. The second silica gel 5 is attached to the optical film 3 and provided with a substantially circular through hole 50.

The through hole 40 of the first silica gel 4, the through hole 50 of the second silica gel 5, the through hole 30 of the optical film 3, the through hole 20 of the polyester film 2, and the through hole 14 of the base 1 correspond in position for receiving the lens.

The protective cover 6 is substantially square and covered on the second silica gel 5 through the corresponding double-sided tape 7 to seal the lens inside the lens protective structure 100.

In other embodiments, the air escape channel 16 can have other shapes. The air escape channel 16 in communication with the inside and outside of the lens protection structure 100 can reduce an air pressure difference between the inside and the outside of the lens protection structure 100 caused during a manufacturing process and in the environment. The air escape channel 16 further has a ventilation function, thereby improving a stability of adhesion of the lens protection structure 100 to the lens and facilitating removal of the lens protection structure 100 from the lens.

In addition, the air escape channel 16 can absorb dust and impurities in the air entering the air escape channel 16, thereby reducing contamination of the lens.

A number of the air escape channel 16 is not limited to two. In other embodiments, a number of the air escape channel 16 can be more than two.

Furthermore, the air escape channel 16 can be provided on the base 1 made of different materials, such as foam, injection molding, silicon foam, or the like.

The through hole 14, the through hole 20, the through hole 30, the through hole 40, and the through hole 50 may be the same size or different sizes.

Figure 5:
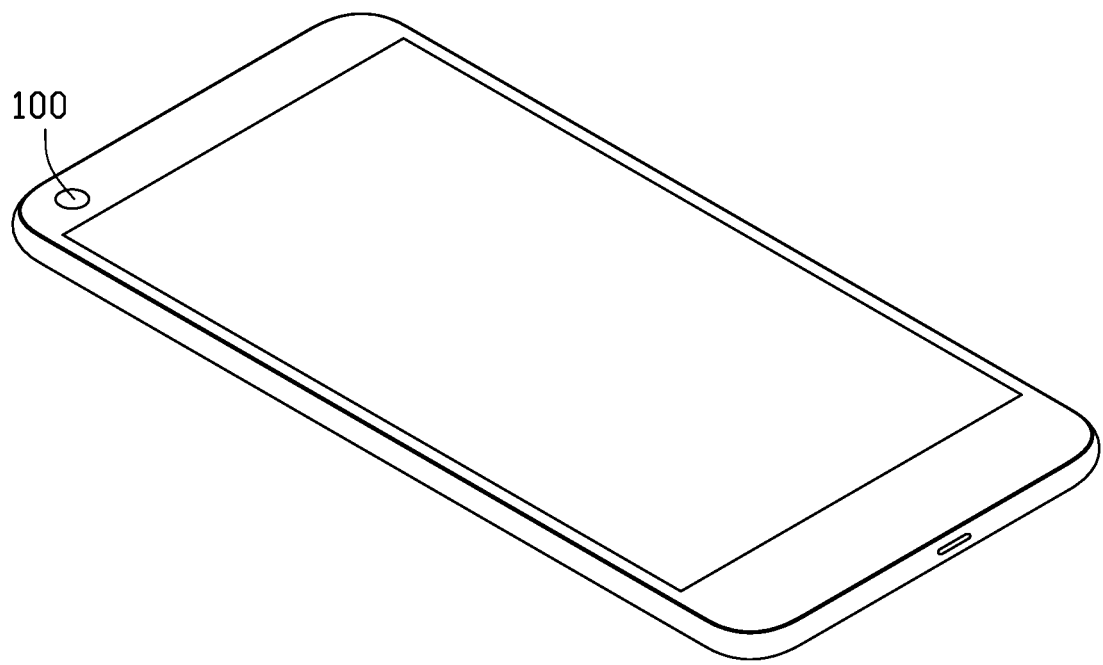
FIG. 5 is a perspective diagram of an electronic device having the lens protection structure.

Referring to FIG. 5, the lens protection structure 100 can be applied to an electronic device 200, such as a mobile phone, a wearable device, a desktop device, a monitoring device, or the like to protect the lens.

In summary, the lens protection structure 100 has the following beneficial effects. The air escape channel 16 communicates the inside of the base 1 to the outside, thereby reducing an air pressure difference between the inside and the outside of the base 1. The air escape channel 16 has air permeability and can absorb dust and impurities, and can also improve the stability of the lens protection structure 100 adhering to the lens and facilitate removal of the lens protection structure 100. The air escape channel 16 adopts an angled structure, which increases the total length of the air escape channel 16 to collect dust and impurities in the air, so that the risk of contaminating the lens is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens protection structure comprising:
   a base;
   a polyester film;
   a first silica gel;
   a second silica gel; and a protective cover; wherein:

each of the base, the polyester film, the first silica gel, and the second silica gel defines a through hole for cooperatively receiving a lens;

the polyester film is coupled to a surface of the base, and the first silica gel is coupled to a surface of the base opposite the polyester film;

the second silica gel is coupled to the polyester film;

the protective cover is coupled to the second silica gel and seals a receiving cavity within the base;

two air escape channels are defined in the base; and each of the air escape channels communicate the receiving cavity of the base to an exterior of the lens protection structure; each of the air escape channels comprises a first end in communication with the receiving cavity, a second end in communication with outside, a first channel portion, a second channel portion, and a third channel portion, the third channel portion is coupled between the first channel portion and the second channel portion, an acute angle is formed between the third channel portion and the first channel portion and between the third channel portion and the second channel portion respectively, the air escape channels are spaced from each other and recessed in the surface of the base coupled to the polyester film, the first channel portions of the air escape channels are adjacent on the surface of the base coupled to the polyester film and parallel to each other.

2. The lens protection structure of claim 1, wherein:
the first channel portion is parallel to the second channel portion.

3. The lens protection structure of claim 1, wherein:
the base is made of silicon foam.

4. The lens protection structure of claim 1, wherein:
the base is made of injection molding material.

5. The lens protection structure of claim 1, further comprising an optical film, wherein:
the optical film is coupled to the polyester film.

6. An electronic device comprising a lens protection structure, the lens protection structure comprising:
a base;
a polyester film;
a first silica gel;
a second silica gel; and
a protective cover; wherein:

each of the base, the polyester film, the first silica gel, and the second silica gel defines a through hole for cooperatively receiving a lens;

the polyester film is coupled to a surface of the base, and the first silica gel is coupled to a surface of the base opposite the polyester film;

the second silica gel is coupled to the polyester film;

the protective cover is coupled to the second silica gel and seals a receiving cavity within the base;

two air escape channels are defined in the base; and each of the air escape channels communicate the receiving cavity of the base to an exterior of the lens protection structure; each of the air escape channels comprises a first end in communication with the receiving cavity, a second end in communication with outside, a first channel portion, a second channel portion, and a third channel portion, the third channel portion is coupled between the first channel portion and the second channel portion, an acute angle is formed between the third channel portion and the first channel portion and between the third channel portion and the second channel portion respectively, the air escape channels are spaced from each other and recessed in the surface of the base coupled to the polyester film, the first channel portions of the air escape channels are adjacent on the surface of the base coupled to the polyester film and parallel to each other.

7. The electronic device of claim 6, wherein:
the first channel portion is parallel to the second channel portion.

8. The electronic device of claim 6, wherein:
the base is made of silicon foam.

9. The electronic device of claim 6, wherein:
the base is made of injection molding material.

10. The electronic device of claim 6, wherein:
the lens protection structure further comprises an optical film; and
the optical film is coupled to the polyester film.

* * * * *